United States Patent
Chheda et al.

(10) Patent No.: US 9,365,226 B1
(45) Date of Patent: Jun. 14, 2016

(54) TRANSPORT DOLLY

(71) Applicant: Amazon Technologies, Inc., Reno, NV (US)

(72) Inventors: Kunal Chheda, Medford, MA (US); Scott A. Lefton, Melrose, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/303,245

(22) Filed: Jun. 12, 2014

(51) Int. Cl.
*B62B 3/04* (2006.01)

(52) U.S. Cl.
CPC ........................................ *B62B 3/04* (2013.01)

(58) Field of Classification Search
CPC ................ B62D 61/12; B62B 3/0606–3/0625; B62B 3/02–3/022; B62B 3/0083; B62B 3/0086; B62B 3/0637; B62B 3/0643; B60P 3/00; B60P 3/06; B60P 1/00; B60P 1/02; B60P 1/48; B60P 1/52; B65G 67/02; B65G 67/04; B65G 67/22
See application file for complete search history.

(56) References Cited

U.S. PATENT DOCUMENTS 7,255,206 B1 *  8/2007  Hackbarth ................ B62B 5/04
                                                            188/19

* cited by examiner

*Primary Examiner* — Jeffrey J Restifo
*Assistant Examiner* — Erez Gurari
(74) *Attorney, Agent, or Firm* — Thomas | Horstemeyer, LLP.; Michael D'Aurelio; Jason Perilla

(57) ABSTRACT

Aspects of a transport dolly for repositioning a drive unit are described. In one embodiment, the transport dolly includes a base frame, an elevated handgrip bar, and a wheel lock assembly that locks at least one jack wheel of the drive unit into an engaged position for manual displacement of the drive unit using the elevated handgrip bar. The transport dolly may be relied upon to assist an individual with manual movement of the drive unit, by engaging and locking one or more jack wheels of the drive unit into a position which lifts the drive unit off the drive wheels of the drive unit. Once the jack wheels are engaged and locked in position, the drive unit may be more easily repositioned manually.

20 Claims, 9 Drawing Sheets

TRANSPORT DOLLY

BACKGROUND

Robotic drive units and other automated robotic systems may be useful in warehouse and fulfillment center operations for moving shelves and other heavy items. For example, a low-lying robotic drive unit with a top mounted lifting plate may be positioned under a shelving system and relied upon to lift the shelving system off the ground for transport. Using the robotic drive unit, shelving systems may be moved from place to place in a warehouse to automate some package handling operations. In certain cases, however, it may become necessary to manually move robotic drive units and other automated robotic systems.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

A robotic drive unit or other automated robotic system may be relied upon to automatically and autonomously transport shelving systems or other items from place to place in a warehouse or fulfillment center, for example. In certain circumstances, however, it is noted that it may be necessary for an individual to manually move a robotic drive unit in the warehouse or fulfillment center. For example, if the robotic drive unit experiences a battery failure, needs repair, or requires a certain type of repositioning, it may be necessary to manually move the robotic drive unit.

Figure 1:
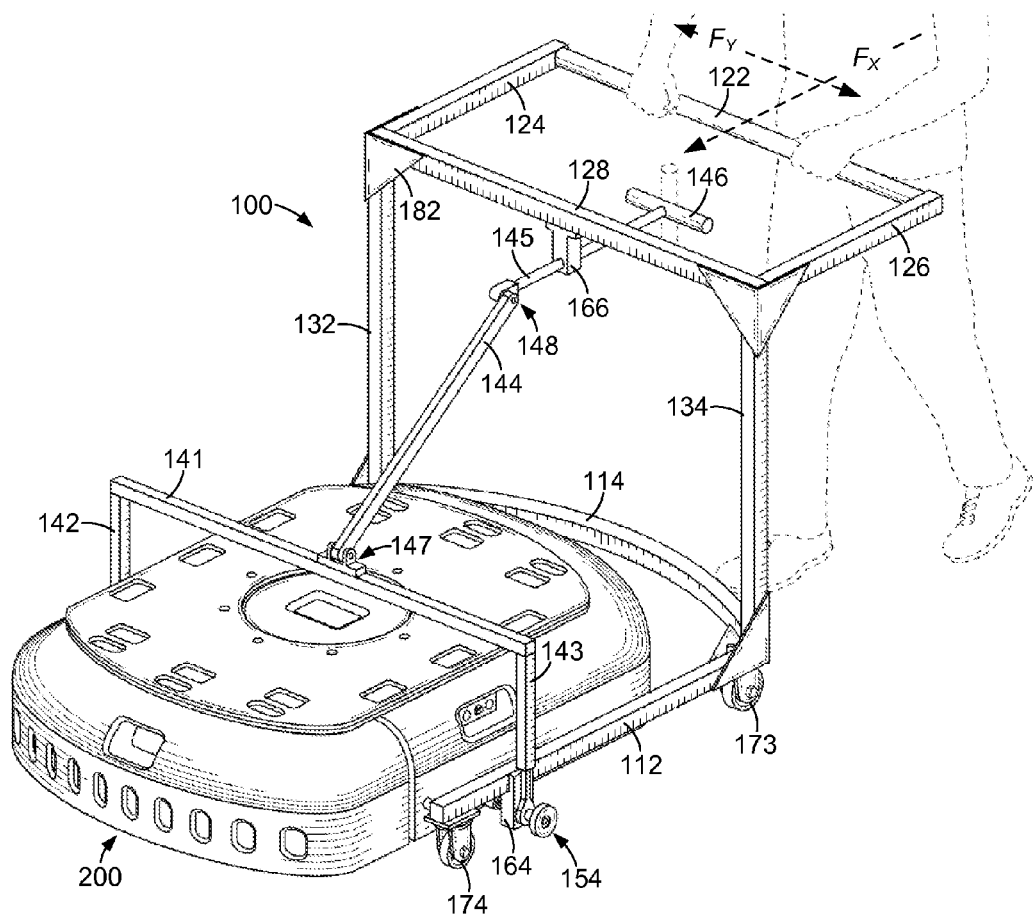
FIG. 1 illustrates a perspective view of an example transport dolly and a robotic drive unit, according to one embodiment.

For additional context, FIG. 1 illustrates a perspective view of an example transport apparatus or dolly 100 and a robotic drive unit 200, according to one embodiment. Because the robotic drive unit 200 may be relatively heavy, bulky, and have a low center of gravity, it may be difficult to move it manually. It may also be difficult to move the robotic drive unit 200 if the drive wheels of the robotic drive unit 200 offer resistance, for example, due to direct mechanical connection to a motor. Further, it should be appreciated that, if the robotic drive unit 200 is relatively low-lying as compared to the average height of an individual, the individual may be required to bend over and apply a large lateral force to manually move the robotic drive unit 200. In this context, according to aspects of the embodiments described herein, the transport dolly 100 may be relied upon to assist an individual with manual movement of the robotic drive unit 200.

As further described below, in one aspect, the transport dolly 100 may be relied upon to engage and lock one or more jack wheels of the robotic drive unit 200. Once engaged to lock the jack wheels, the robotic drive unit 200 may be more easily repositioned manually. Further, in another aspect, the transport dolly 100 assists an individual with manual movement of the robotic drive unit 200 by displacing a lateral force provided at an approximate height of the individual's waist or chest to a lower-lying position or location of the robotic drive unit, while generally maintaining the direction of the lateral force.

Although certain embodiments of the transport dolly 100 are described herein in connection with the displacement of a robotic drive unit 200, the transport dolly 100 is not limited to transporting any particular type of robotic drive unit, drive unit, item, parcel, article, etc. It should also be appreciated that the transport dolly 100 may be relied upon to transport drive units, items, parcels, articles, etc. that are not robotic or driven by a motor. Further, as used herein, the terms robotic drive unit, drive unit, item, parcel, and article are not intended to be limited to any particular type, size, shape, or weight. The embodiments of the transport dolly 100 described herein may be relied upon to assist with the movement or transportation of any robotic drive units, drive units, items, parcels, articles, etc., without limitation.

Figure 2:
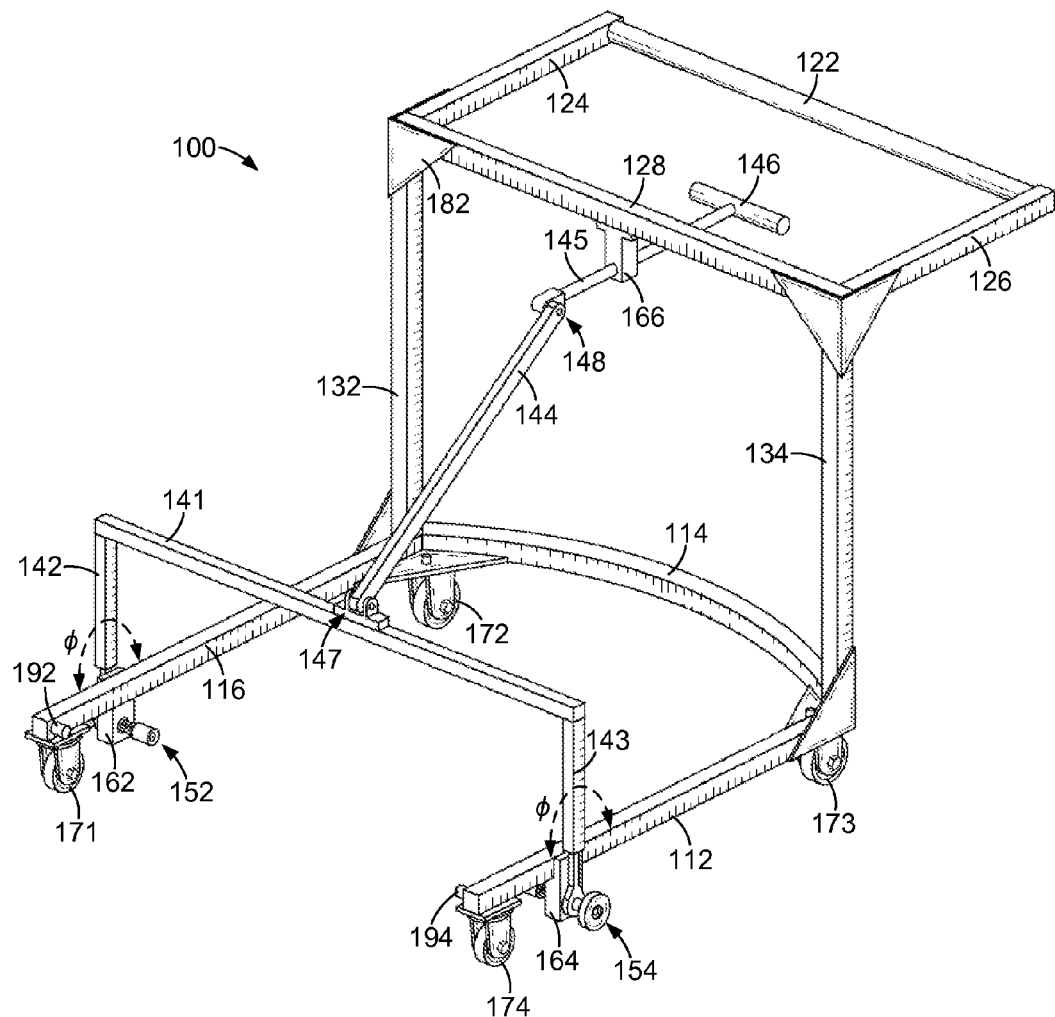
FIG. 2 illustrates the perspective view of the example transport dolly of FIG. 1, without the robotic drive unit.

Referring again to the drawings, embodiments of the transport dolly are described in further detail. FIG. 1 illustrates a perspective view of the transport dolly 100 and a robotic drive unit 200, according to one embodiment, and FIG. 2 illustrates the perspective view of the example transport dolly 100, without the robotic drive unit 200. As further described herein, the transport dolly 100 may be relied upon to assist an individual with manual movement of the robotic drive unit 200. The robotic drive unit 200 may be embodied as a KIVA® R drive unit configured to move shelving systems in a warehouse, fulfillment center, or materials handling facility, for example. It should be appreciated, however, that the KIVA® R drive unit is provided by way of example only, and the transport dolly 100 may be relied upon for displacement of other drive units, items, parcels, articles, etc.

Among other elements, the robotic drive unit 200 may include one or more batteries, motors, control systems, communications systems, sensors, etc. In one example mode of operation, the robotic drive unit 200 may be relied upon to automatically and autonomously transport shelving systems from place to place in a warehouse or fulfillment center. In certain circumstances, however, it is noted that the robotic drive unit 200 must be manually moved by an individual in the warehouse or fulfillment center. For example, if the robotic drive unit 200 experiences a battery failure, needs repair, or requires a certain type of repositioning, it may be necessary to manually move the robotic drive unit 200.

Referring between FIGS. 1 and 2, the transport dolly 100 includes a base frame, an elevated handgrip, and a wheel lock assembly, among other elements described herein. The base frame includes an arched crossbar 114, a first extension bar 112 that extends from a first distal end of the arched crossbar 114, and a second extension bar 116 that extends from a second distal end of the arched crossbar 114. The elevated handgrip includes an elevated handgrip bar 122, an elevated crossbar 128, a first extension bar 124 that extends between the elevated handgrip bar 122 and the elevated crossbar 128 at one end, and a second extension bar 126 that extends between the elevated handgrip bar 122 and the elevated crossbar 128 at another end. As also illustrated in FIGS. 1 and 2, the elevated handgrip is supported by the elevation columns 132 and 134 which extend from a top of the base frame to a bottom of the elevated handgrip.

The transport dolly 100 further includes a wheel lock assembly that locks a jack wheel of the robotic drive unit 200 into an engaged position for manual displacement of the robotic drive unit 200. As illustrated in FIGS. 1 and 2, the wheel lock assembly includes a ratcheting lever composed of a first ratcheting side arm 142, a second ratcheting side arm 143, and a ratcheting lever crossbar 141. At distal ends of the first and second ratcheting side arms 142 and 143, the wheel lock assembly includes first and second spline shaft assemblies 152 and 154, respectively. The structural elements of the first and second spline shaft assemblies 152 and 154 are described in further detail below with reference to FIGS. 6A and 6B.

The wheel lock assembly further includes a handle 146 and a linear displacement rod 145 that displaces the ratcheting lever, including the first ratcheting side arm 142, the second ratcheting side arm 143, and the ratcheting lever crossbar 141, within at least a predetermined range of angular displacement $\phi$ (FIG. 2). In the example embodiment illustrated in FIGS. 1 and 2, joints 147 and 148 and a displacement bar 144 are coupled between the linear displacement rod 145 and the ratcheting lever crossbar 141. Further, the linear displacement rod 145 extends through the locking handle block 166, which is secured to the elevated crossbar 128. As further described below, the movement within the range of angular displacement $\phi$ permits the jack wheels of the robotic drive unit 200 to be engaged and locked in place. As further described below with reference to FIG. 8, the jack wheels of the robotic drive unit 200 may be locked in place by rotating the handle 146 by 90 degrees, for example, as illustrated in FIG. 1 by the dashed outline of the handle 146.

Here, it is noted that the primary function of the jack wheels of the robotic drive unit 200 is to raise the robotic drive unit 200 off the drive wheels of the robotic drive unit 200. As described above, the drive wheels of the robotic drive unit 200 may be mechanically coupled to the motor of the robotic drive unit 200 and may offer resistance. FIGS. 1 and 2 also illustrate a right-side spline shaft mount 162 and a left-side spline shaft mount 164, each secured to the base frame of the transport dolly 100. As further described herein, the handle 146 and the linear displacement rod 145 displace the ratcheting lever, including the first ratcheting side arm 142, the second ratcheting side arm 143, and the ratcheting lever crossbar 141, within at least the predetermined range of angular displacement $\phi$ about a pivot point provided at the right-side spline shaft mount 162 and the left-side spline shaft mount 164.

As illustrated in FIGS. 1 and 2, the transport dolly 100 also includes wheels 171-174 secured to the base frame of the transport dolly 100. In various embodiments, the wheels 171-174 may include any fixed wheels, swiveling casters, or other types of wheels suitable for the application. In one embodiment, the wheels 171 and 174 may be fixed in position, and the wheels 172 and 173 may be swiveling casters, although other configurations are within the scope and spirit of the embodiments. Although four wheels 171-174 are illustrated at certain positions in FIG. 2, the transport dolly 100 may include fewer wheels or additional wheels at other positions. Additionally, it is noted that the wheels 171-174 may be secured or mounted to the base frame of the transport dolly 100 by any means suitable, such as by screws, rivets, or welds, for example.

With regard to other features of the transport dolly 100, the transport dolly 100 may also include, in various embodiments, bumpers 192 and 194, as illustrated in FIG. 2. The bumpers 192 and 194 may be formed from plastic or stiff rubber, for example, and are relied upon to prevent the robotic drive unit 200 from being scratched or otherwise damaged by the transport dolly 100, as least to some extent. It should be appreciated that the bumpers 192 and 194 may be secured to the base frame of the transport dolly 100 at locations in addition or alternative to those illustrated in FIG. 2.

Referring again to FIG. 1, it is noted that the elevated handgrip bar 122 of the transport dolly 100 is elevated to a height at or near the waist or chest of an individual. Thus, during use, the individual may comfortably apply forces to the elevated handgrip bar 122. These forces are, in turn, translated down to the robotic drive unit 200. Because the transport dolly 100 is designed so that the elevated handgrip bar 122 is at or near waist or chest height, it may be easier and more comfortable for the individual to apply the forces $F_Y$ and $F_X$ in directions orthogonal to that of the force of weight of the robotic drive unit 200. Stated differently, if the individual were to bend over and directly push against the robotic drive unit 200, it is more likely that the applied force would include a component parallel (or additive) to the direction of the force of weight of the robotic drive unit 200, increasing friction and work.

It should be appreciated that the size and shape of various elements of the transport dolly 100 may vary among embodiments. For example, the length of the elevation columns 132 and 134 may vary based on the height of the user of the transport dolly 100. Similarly, the size of the base frame of the transport dolly 100 may vary depending upon the size of the robotic drive unit 200. In certain embodiments, elements of the transport dolly 100 may be adjustable so as to accommodate robotic drive units of various sizes and to accommodate various users.

The transport dolly 100 may be constructed from any materials suitable for the application, such as aluminum, steel, plastic, other materials, or any combination thereof, without limitation. The type of material may be selected based on the application for which the transport dolly 100 is designed. For example, if the transport dolly 100 is designed for transportation of relatively large and/or heavy parcels, then the transport dolly 100 may be constructed from a material of relatively high strength, even if the material is heavy. On the other hand, if the transport dolly 100 is designed for transportation of relatively small and/or light parcels, then the transport dolly 100 may be constructed from a material of suitable strength but relatively lighter weight. Certain structural elements or parts of the transport dolly 100 may be formed, for example, as extrusions or pipes. The cross sections of these structural elements may be substantially square, rectangular, circular, or any other suitable shape, among embodiments, without limitation.

The structural elements of the transport dolly 100, such as the base frame, elevated handgrip, wheel lock assembly, etc., may be secured or coupled together by welds, screws, rivets, joints, or any other suitable means, or combinations thereof, without limitation. Among embodiments, the transport dolly 100 may be assembled in any suitable manner for sufficient strength and durability for the application. In some embodiments, at certain corners between structural bars, columns, or rods, for example, the transport dolly 100 may include one or more supporting corner plates, such as corner plate 182, which may be secured by welds, screws, rivets, or any other suitable means.

In FIG. 1, the transport dolly 100 is illustrated in a position for transporting the robotic drive unit 200. Particularly, the transport dolly 100 is positioned over and engaged with the robotic drive unit 200 such that, with the application by an individual of forward or reverse (e.g., $F_X$) or lateral (e.g., $F_Y$) forces (or combinations thereof), the transport dolly 100 and the robotic drive unit 200 may be moved from place to place with relative ease. In this context, as further described below with reference to FIGS. 3A and 3B, it should be appreciated that the transport dolly 100 and the robotic drive unit 200 may be moved in this configuration with the assistance of a combination of jack wheels 230 of the robotic drive unit 200, non-driven wheels 240 of the robotic drive unit 200, and/or the wheels 171-174 of the transport dolly 100.

Principally, the transport dolly 100 is designed to assist with the transportation of robotic drive units, drive units, items, parcels, or other articles, for example, that are relatively low-lying, low to the ground, or have a low profile. Especially in situations where such items are low-lying and relatively heavy, the transport dolly 100 is designed to assist an individual in the transportation of the items by displacing a lateral force provided at an approximate height of the individual's waist or chest to lower location, while generally maintaining the direction of the lateral force.

Figure 3A:
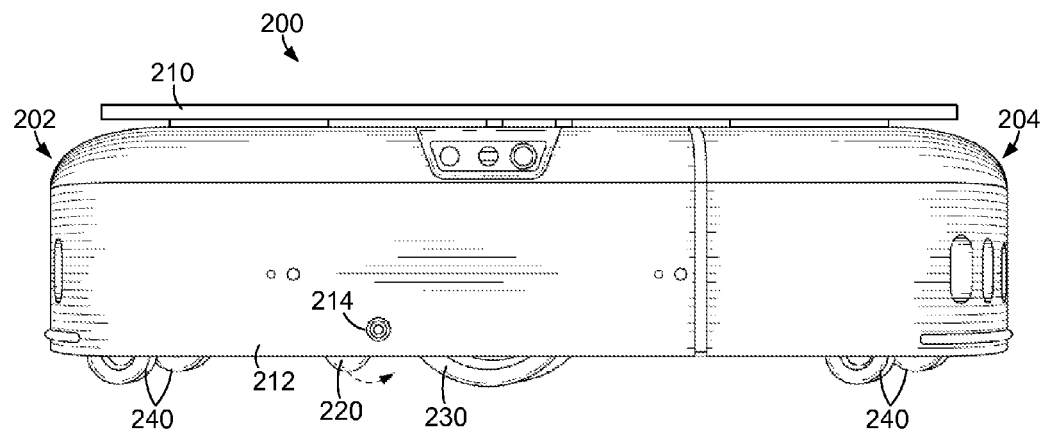
FIG. 3A illustrates a side view of the robotic drive unit of FIG. 1 with a disengaged jack wheel.
Figure 3B:
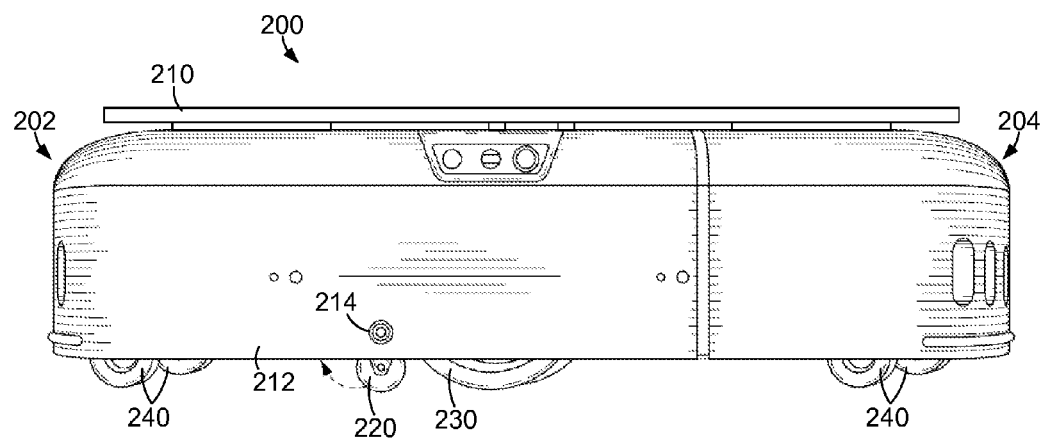
FIG. 3B illustrates a side view of the robotic drive unit of FIG. 1 with an engaged jack wheel.

FIG. 3A illustrates a side view of the robotic drive unit 200 of FIG. 1 with a disengaged jack wheel 220, and FIG. 3B illustrates a side view of the robotic drive unit 200 of FIG. 1 with an engaged jack wheel 220. Among FIGS. 3A and 3B, a front end 202 and a rear end 204 of the robotic drive unit 200 are illustrated. Further, the robotic drive unit 200 includes a top mounted lifting plate 210, an exterior housing 212, drive wheels 230 and non-driven wheels 240. In one embodiment, the robotic drive unit 200 includes a jack wheel 220 located proximate to each of the right and left sides of the robotic drive unit 200. In this context, it is noted that the wheel lock assembly of the transport dolly 100 may be relied upon to engage and lock jack wheels on both right and left sides of the robotic drive unit 200.

As illustrated in FIGS. 3A and 3B, on one side of the exterior housing 212 of the robotic drive unit 200, an engagement hole 214 provides access to a drive stub of the jack wheel 220. Although not shown, on another side of the exterior housing 212, the robotic drive unit 200 includes another engagement hole which provides access to another drive stub of another jack wheel of the robotic drive unit 200. As shown between FIGS. 3A and 3B, by accessing the drive stub of the jack wheel 220, the jack wheel 220 may be rotated from the disengaged (e.g., tucked-away) position illustrated in FIG. 3A to the engaged (e.g., extended) position illustrated in FIG. 3B. Particularly, by rotating the drive stub of the jack wheel 220 in a counter-clockwise direction, the jack wheel 220 may be rotated from the disengaged position illustrated in FIG. 3A to the engaged position illustrated in FIG. 3B, and locked in the engaged position.

Here, it is again noted that the primary function of the jack wheel 220 (and any other jack wheel(s) of the robotic drive unit 200 which are not shown) is to raise and support the robotic drive unit 200 off the drive wheels 230. Because the drive wheels 230 may be mechanically coupled to the motor of the robotic drive unit 200, they may offer resistance, and it may be generally easier to move the robotic drive unit 200 if it is raised and supported off the drive wheels 230. In one embodiment, the jack wheel 220 may be spring loaded or biased to return (e.g., snap back) to the disengaged position illustrated in FIG. 3A. Thus, not only is the wheel lock assembly (i.e., the first and second ratcheting side arms 142 and 143, ratcheting lever crossbar 141, handle 146, linear displacement rod 145, etc.) of the transport dolly 100 relied upon to engage the jack wheels on both the right and left sides of the robotic drive unit 200, but the wheel lock assembly is also relied upon to lock the jack wheels in the engaged position illustrated in FIG. 3B. The locking structures and features of the wheel lock assembly are further described below with reference to FIG. 8.

Figure 4:
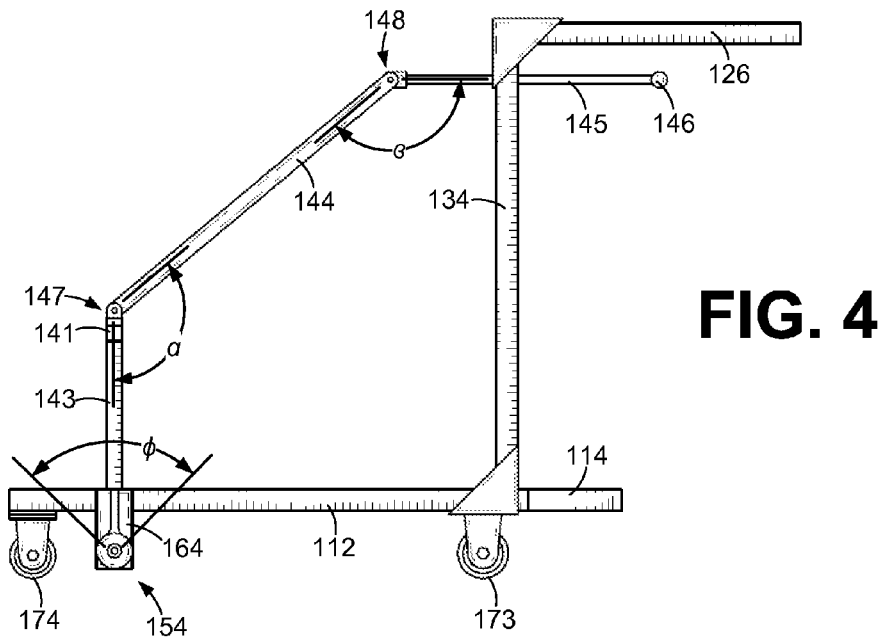
FIG. 4 illustrates a side view of the example transport dolly of FIG. 1, according to one embodiment.
Figure 5:
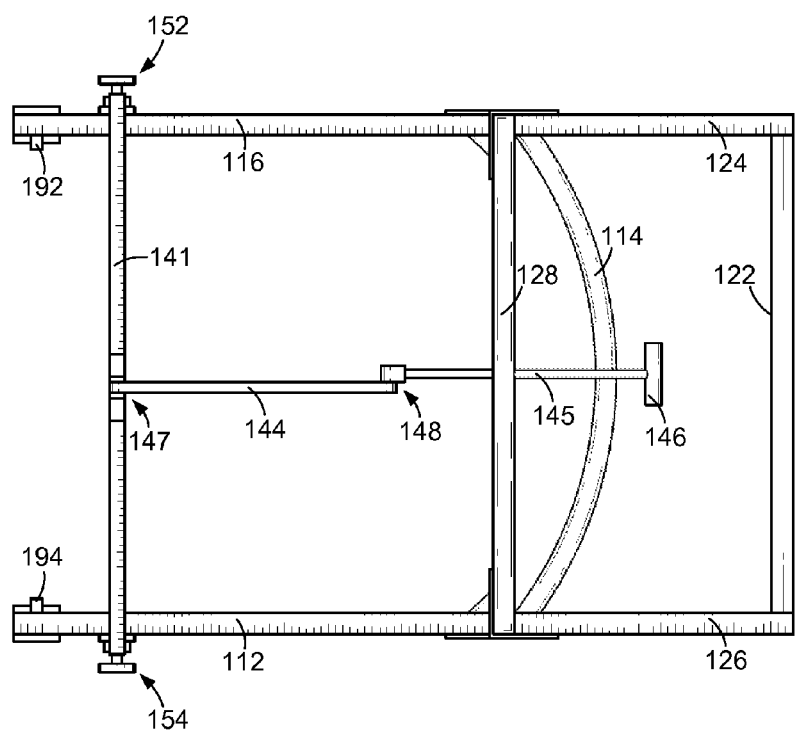
FIG. 5 illustrates a top view of the example transport dolly of FIG. 1, according to one embodiment.

FIG. 4 illustrates a side view of the transport dolly 100 of FIG. 1, and FIG. 5 illustrates a top view of the example transport dolly 100 of FIG. 1, according to one embodiment. As illustrated between FIGS. 4 and 5, the transport dolly 100 includes the base frame embodied as the arched crossbar 114, the first extension bar 112, and the second extension bar 116. The transport dolly 100 further includes the elevated handgrip embodied as the elevated handgrip bar 122, the elevated crossbar 128, the first extension bar 124, and the second extension bar 126. As also illustrated in FIGS. 4 and 5, the elevated handgrip is supported by the elevation columns 132 and 134 which extend from a top of the base frame to a bottom of the elevated handgrip.

The transport dolly 100 further includes the wheel lock assembly embodied as a ratcheting lever composed of a first ratcheting side arm 142, a second ratcheting side arm 143, and a ratcheting lever crossbar 141. At distal ends of the first and second ratcheting side arms 142 and 143, the wheel lock assembly includes first and second spline shaft assemblies 152 and 154, respectively, which are described in further detail below with reference to FIGS. 6A and 6B.

The wheel lock assembly further includes the handle 146 and the linear displacement rod 145 that displace the ratcheting lever crossbar 141 within at least the predetermined range of angular displacement φ. In the example embodiment illustrated in FIGS. 4 and 5, the joint 147 permits an angular range of freedom a between the ratcheting lever crossbar 141 and the displacement bar 144, and the joint 148 permits an angular range of freedom θ between the displacement bar 144 and the linear displacement rod 145. Based on the angular ranges of freedom α and θ provided by the joints 147 and 148, a linear displacement of the handle 146 and the linear displacement rod 145 may be translated into the angular displacement φ of the ratcheting lever crossbar 141. In turn, the angular displacement φ of the ratcheting lever crossbar 141 permits the jack wheels of the robotic drive unit 200 to be engaged (FIG. 3B) and locked in place, as further described below with reference to FIGS. 7A and 7B.

Figure 6A:
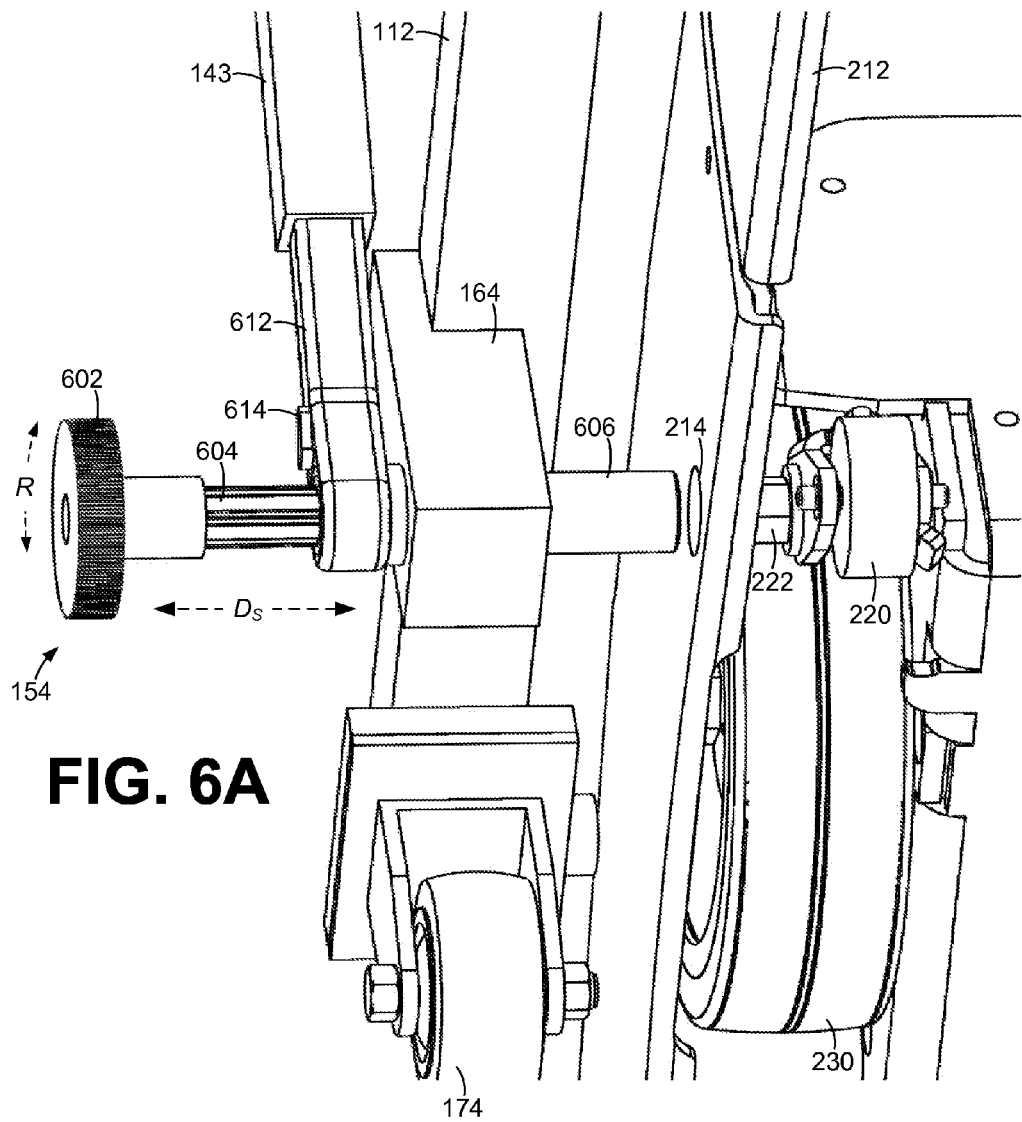
FIG. 6A illustrates a perspective view of a spline shaft assembly of the transport dolly of FIG. 1 and the jack wheel of the robotic drive unit of FIG. 1, according to one embodiment.

In FIG. 6A, an underside of the transport dolly 100 and the robotic drive unit 200 are shown. More specifically, FIG. 6A illustrates a perspective view of the spline shaft assembly 154 of the transport dolly 100 and the jack wheel 220 of the robotic drive unit 200, according to one embodiment. In this view, the transport dolly 100 is positioned over the robotic drive unit 200 (e.g., as in FIG. 1), and the spline shaft assembly 154 is aligned with the engagement hole 214 of the robotic drive unit 200.

In FIG. 6A, at the end of the second ratcheting side arm 143 of the wheel locking assembly, a ratcheting end 612 is secured. It is noted that, in the embodiment of the transport dolly 100 illustrated in FIGS. 1 and 2, another ratcheting end similar to the ratcheting end 612 is secured to the end of the first ratcheting side arm 142 (FIG. 2). The spline shaft assembly 154 extends through the head of the ratcheting end 612. The ratcheting end 612 of the wheel locking assembly operates as a type of ratcheting wrench, as further described below, and is relied upon to turn or rotate the spline shaft assembly 154.

The ratcheting end 612 includes a ratchet knob 614. By adjusting the ratchet knob 614, a direction of ratcheting (i.e., clockwise or counter-clockwise) of the head of the ratcheting end 612 may be set. In other words, in one embodiment, by adjusting the ratchet knob 614 to one side, the ratcheting end 612 may be set to grip the spline shaft assembly 154 and turn the spline shaft assembly 154 in the clockwise direction, when a force is applied to the ratcheting end 612 as a lever. Alternatively, by adjusting the ratchet knob 614 to a second side, the ratcheting end 612 may be set to grip and turn the spline shaft assembly 154 in the counter-clockwise direction. Additionally, by adjusting the ratchet knob 614 to a third (e.g., neutral) position, the ratcheting end 612 may be set so that the spline shaft assembly 154 rotates freely.

Referring again to FIG. 6A, the spline shaft assembly 154 includes a spline shaft 604, a knurled knob 602 secured to a first distal end of the spline shaft 604, and a socket 606 secured to a second distal end of the spline shaft 604. The spline shaft assembly 154 is held in place by the ratcheting end 612 and the left-side spline shaft mount 164, because the spline shaft 604 extends through both the ratcheting end 612 and the left-side spline shaft mount 164. Here, the left-side spline shaft mount 164 provides the pivot point which permits the predetermined range of angular displacement $\phi$ for the wheel locking assembly (FIGS. 2 and 4).

It is noted that, while the spline shaft assembly 154 is illustrated in FIG. 6A, the spline shaft assembly 152 of the transport dolly 100 is similar in structure to the spline shaft assembly 154 (e.g., includes corresponding elements). The spline shaft assembly 154 may be referred to as a left-side spline shaft assembly, and the spline shaft assembly 152 may be referred to as a right-side spline shaft assembly. In this sense, the left-side spline shaft assembly 154 comprises a left-side spline shaft, a left-side knurled knob, and a left-side socket. Similarly, the right-side spline shaft assembly 152 comprises a right-side spline shaft, a right-side knurled knob, and a right-side socket.

Figure 6B:
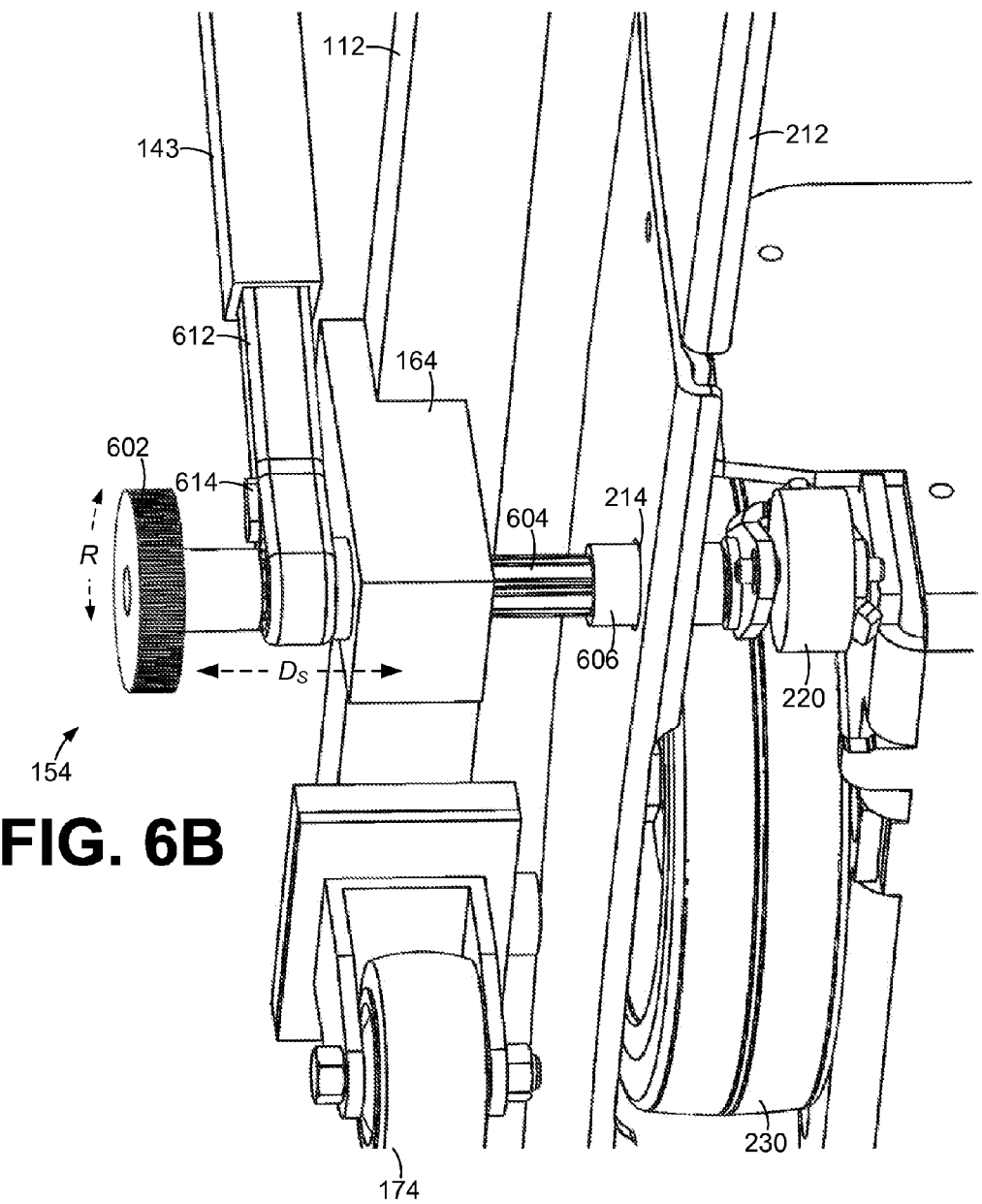
FIG. 6B illustrates the spline shaft assembly of FIG. 6A positioned on a drive stub of the jack wheel of the robotic drive unit of FIG. 1, according to one embodiment.

In FIG. 6A, a drive stub 222 of the jack wheel 220 of the robotic drive unit 200 is also illustrated. According to aspects of the embodiments described herein, the spline shaft assembly 154 may be slid, adjusted, or moved by hand in the direction $D_S$. Additionally, the spline shaft assembly 154 may be rotated by hand in the direction R. By moving the spline shaft assembly 154 in the direction $D_S$, the socket 606 of the spline shaft assembly 154 may be pushed through the engagement hole 214 on the left side of the robotic drive unit 200. Once pushed through the engagement hole 214, the drive stub 222 of the jack wheel 220 may be inserted into the socket 606. If necessary, the knurled knob 602 may be slightly rotated clockwise or counter-clockwise in the direction R, so that the drive stub 222 is adequately seated into the socket 606. For reference, FIG. 6B illustrates the drive stub 222 of the jack wheel 220 inserted into the socket 606 of the spline shaft assembly 154 of FIG. 6A. Although not illustrated, the spline shaft assembly 152 may also be adjusted so as to extend though the engagement hole on the right side of the robotic drive unit 200, and a drive stub of the jack wheel on the right side of the robotic drive unit 200 may be inserted and seated into the right-side socket of the spline shaft assembly 152.

Once the drive stub 222 of the jack wheel 220 is seated into the socket 606, a rotational or angular force may be applied to the drive stub 222 by way of the ratcheting end 612, to turn or rotate the drive stub 222 and engage or disengage the jack wheel 220. Similarly, once the drive stub of the jack wheel on the right side of the robotic drive unit 200 is seated into the right-side socket of the spline shaft assembly 152, a rotational or angular force may be applied to this drive stub to engage or disengage the jack wheel on the right side of the robotic drive unit 200. For example, once the ratchet knob 614 is set, a force may be applied to the ratcheting end 612 from the ratcheting lever (i.e., the first ratcheting side arm 142, the second ratcheting side arm 143, and the ratcheting lever crossbar 141), to turn or rotate the spline shaft assembly 154. The use of the ratcheting end 612 of the second ratcheting side arm 143 as a lever to turn or rotate the spline shaft assembly 154 (and the use of the ratcheting end of the first ratcheting side arm 142 to turn or rotate the spline shaft assembly 152) is described in further detail below with reference to FIGS. 7A and 7B.

Figure 7A:
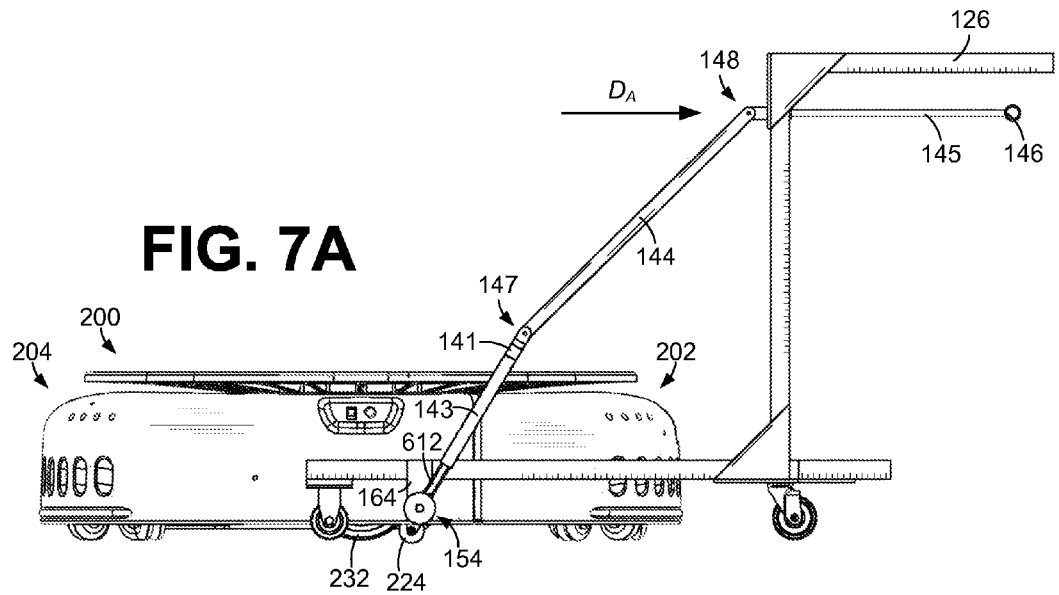
FIG. 7A illustrates a side view of the example transport dolly of FIG. 1, ratcheted to engage the jack wheel of the robotic drive unit of FIG. 1 from a first direction, according to one embodiment.
Figure 7B:
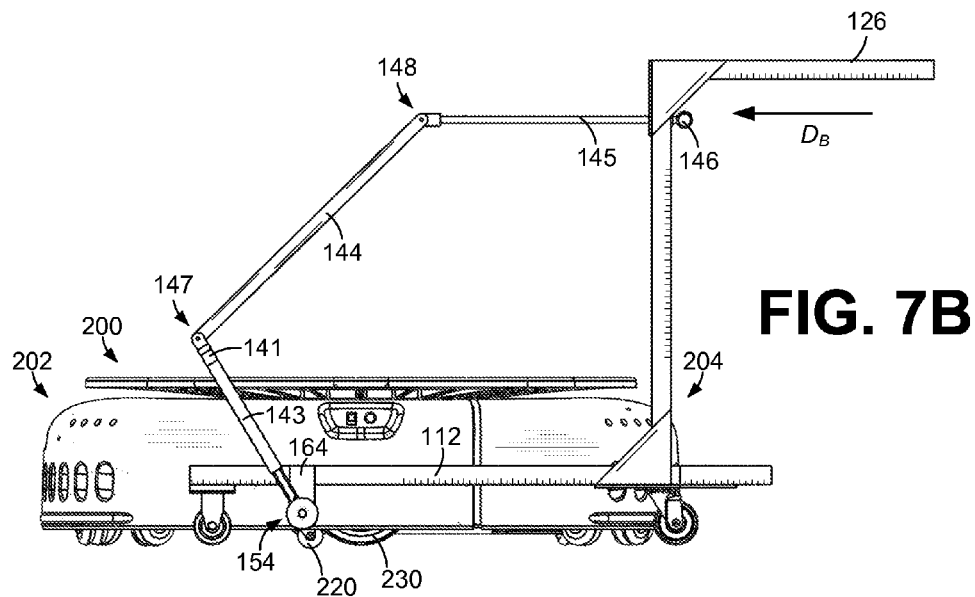
FIG. 7B illustrates a side view of the example transport dolly of FIG. 1, ratcheted to engage the jack wheel of the robotic drive unit of FIG. 1 from a second direction, according to one embodiment.

FIG. 7A illustrates a side view of the example transport dolly 100 of FIG. 1, ratcheted to engage a jack wheel 224 of the robotic drive unit 200 from a first direction, and FIG. 7B illustrates a side view of the example transport dolly 100 of FIG. 1, ratcheted to engage the jack wheel 220 of the robotic drive unit 200 from a second direction. In FIG. 7A, the front end 202 of the robotic drive unit 200 is positioned within the base frame of the transport dolly 100, and, in FIG. 7B, the rear end 204 of the robotic drive unit 200 is positioned within the base frame of the transport dolly 100. Here, it is noted that the primary distinction between the views in FIGS. 7A and 7B is that, depending upon the side or end (i.e., end 202 or 204) of the robotic drive unit 200 which is positioned within the transport dolly 100, the jack wheels 220 and 224 are engaged by displacement of the handle 146 and the displacement rod 145 in either the direction $D_A$ or $D_B$.

As illustrated in FIG. 7A, the handle 146 and the displacement rod 145 have been displaced in the direction $D_A$. In turn, the displacement bar 144 pulls the ratcheting lever (i.e., the first ratcheting side arm 142, the second ratcheting side arm 143, and the ratcheting lever crossbar 141) about the pivot point provided at the spline shaft mount 164. As described above with reference to FIGS. 6A and 6B, so long as the drive stub (not shown in FIG. 7A) of the jack wheel 224 has been inserted into the socket 606 of the spline shaft assembly 154 (FIGS. 6A and 6B), the jack wheel 224 is engaged when the displacement bar 144 pulls the ratcheting lever, because the jack wheel 224 is rotated into the engaged position.

As illustrated in FIG. 7B, the handle 146 and the displacement rod 145 have been displaced in the direction $D_B$. In turn, the displacement bar 144 pushes the ratcheting lever (i.e., the first ratcheting side arm 142, the second ratcheting side arm 143, and the ratcheting lever crossbar 141) about the pivot point provided at the spline shaft mount 164. Again, as long as the drive stub 222 (FIG. 6A) of the jack wheel 220 has been inserted into the socket 606 of the spline shaft assembly 154 (FIGS. 6A and 6B), the jack wheel 220 is engaged when the displacement bar 144 pushes the ratcheting lever, because the jack wheel 220 will be rotated into the engaged position. Here, it should be appreciated that, if each of the spline shaft assemblies 152 and 154 (FIG. 2) are adjusted to accept a corresponding drive stub of one of the jack wheels 220 or 224, both the jack wheels 220 and 224 can be engaged at one time, by displacement of the handle 146 and the displacement rod 145 in either the direction $D_A$ or $D_B$. Thus, according to one aspect of the embodiments described here, the transport dolly 100 may be relied upon by an individual to engage more than one jack wheel of the robotic drive unit 200 at one time.

It should be appreciated that, before adjusting the spline shaft assemblies 152 and 154 (FIG. 2) to accept a corresponding drive stub of one of the jack wheels 220 or 224, the handle 146 and the displacement rod 145 may be moved so that the displacement rod 145 is nearly centered about the locking handle block 166 (FIG. 2). From this nearly centered position, the handle 146 and the displacement rod 145 may be pushed or pulled in either the direction $D_A$ or $D_B$, depending upon which side or end (i.e., end 202 or 204) of the robotic drive unit 200 is positioned within the base frame of the transport dolly 100. It should also be appreciated, however, that even if the displacement rod 145 is not centered about the locking handle block 166, the displacement rod 145 may still be pushed or pulled in at least one direction $D_A$ or $D_B$. As the handle 146 and the displacement rod 145 are moved in the direction $D_A$ or $D_B$, the ratcheting lever and the first and second spline shaft assemblies 152 and 154 can be rotated over at least the predetermined range of angular displacement $\phi$ (FIG. 2), and the jack wheels 220 and 224 can be engaged. Once the jack wheels 220 and 224 are engaged, the transport dolly 100 may be pushed, pulled, and/or turned to move the transport dolly 100 and the robotic drive unit 200 together.

Figure 8:
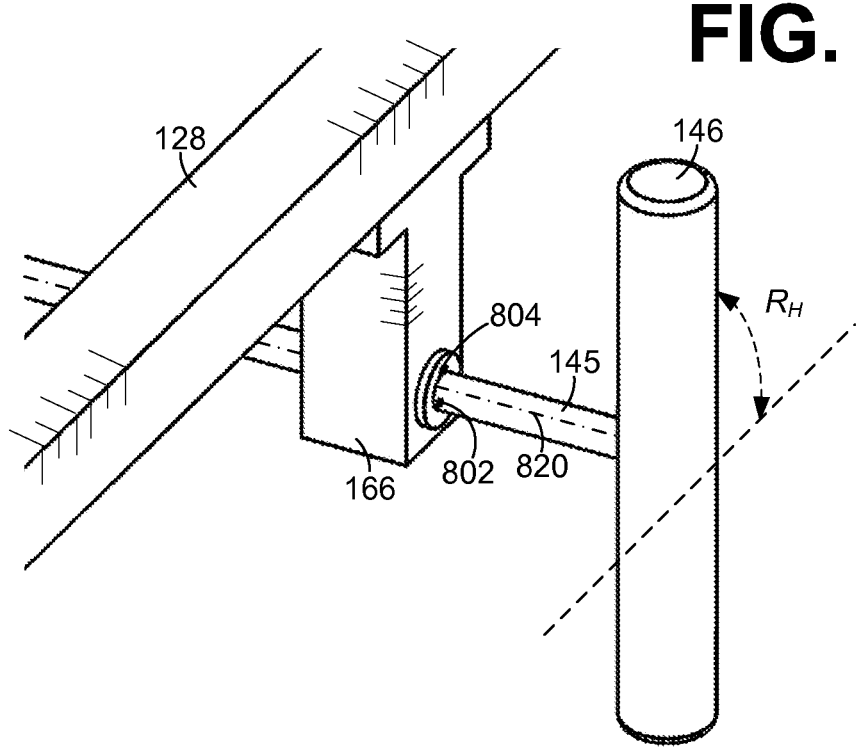
FIG. 8 illustrates a perspective view of a handle of the ratcheting lever of the example transport dolly of FIG. 1.

Turning to FIG. 8, a perspective view of the handle 146 of the ratcheting lever of the example transport dolly 100 of FIG. 1 is illustrated. According to one aspect of the embodiments, once the jack wheels 220 and 224 are engaged, the jack wheels may be locked in place. As described above, the jack wheels 220 and 224 may be spring loaded or biased to return (e.g., snap back) to the disengaged position illustrated in FIG. 3A. To prevent the jack wheels 220 and 224 from returning to the disengaged position, the handle 146 and the displacement rod 145 may be locked in position by rotating the handle 146 in the direction $R_H$ by 90 degrees, for example, as illustrated in FIG. 8.

As illustrated in FIG. 8, the displacement rod 145 extends through the slotted bushing 804 of the locking handle block 166, which is secured to the elevated crossbar 128, and the displacement rod 145 includes one or more locking pins 802. Additionally, the joint 148 (FIGS. 1 and 2) includes a bearing which gives the displacement rod 145 a degree of freedom about the central axis of symmetry 820. In other words, by way of the bearing in the joint 148, the displacement rod 145 (and the handle 146) may be rotated in the direction $R_H$.

When the handle 146 and the displacement rod 145 are rotated so that the handle 146 is parallel to the floor (e.g., as illustrated in FIG. 2), the locking pin 802 may pass though the slotted bushing 804 of the locking handle block 166. On the other hand, when the handle 146 and the displacement rod 145 are rotated as illustrated in FIG. 8, the locking pin 802 cannot pass though the slotted bushing 804. In this way, because the locking pin 802 cannot pass though the slotted bushing 804, the handle 146, the displacement rod 145, and the jack wheels 220 and 224 are locked in position. As noted above, the displacement rod 145 may include one or more locking pins 802 at different positions along the displacement rod 145. Particularly, in one embodiment, the displacement rod 145 includes a locking pin for locking the handle 146 and the displacement rod 145 into each of the positions illustrated in FIGS. 7A and 7B (i.e., at least two locking pins).

Figure 9:
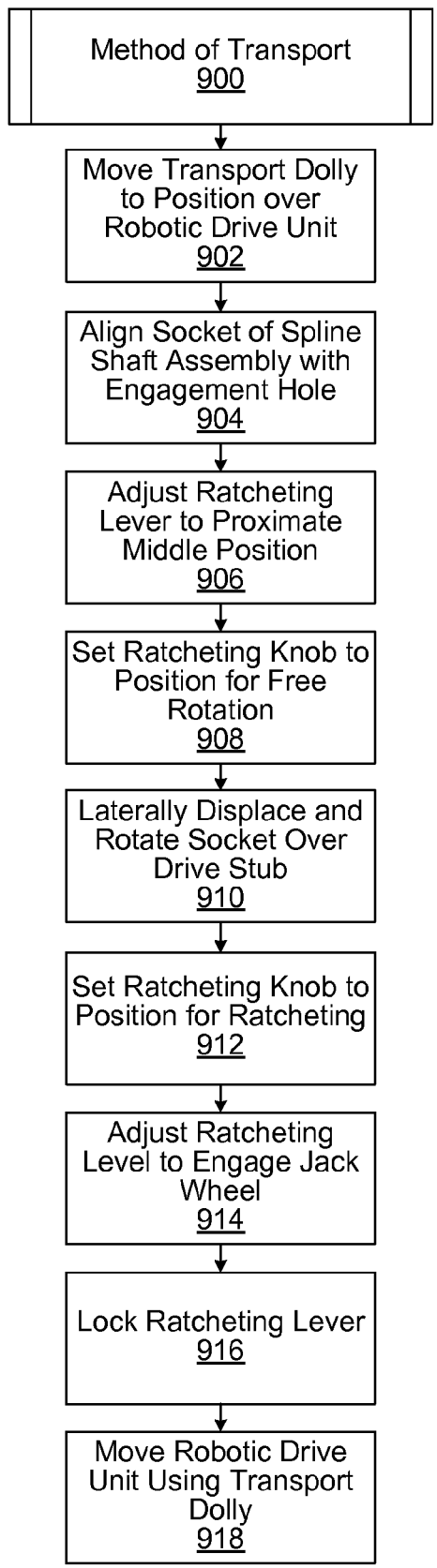
FIG. 9 illustrates a flow diagram of an example method of transport of a drive unit using the transport dolly of FIG. 1, according to one embodiment.

FIG. 9 illustrates a flow diagram of an example method of transport 900 of a drive unit using the transport dolly 100 of FIG. 1 according to one embodiment. Before turning to the flowchart of FIG. 9, it is noted that, although FIG. 9 illustrates an order, it is understood that the order may differ from that which is depicted. For example, two or more blocks may be scrambled relative to the order shown. Further, in some embodiments, one or more blocks may be skipped or omitted. Also, although the method of transport 900 is described with reference to the transport dolly 100 and robotic drive unit 200 of FIGS. 1-8, the method of transport 900 may be used in connection with other transport dollies and/or robotic drive units which vary, at least in part, from the transport dolly 100 and the robotic drive unit 200.

As illustrated in FIG. 9, at reference numeral 902, the method of transport 900 includes moving the transport dolly 100 to a position over the robotic drive unit 200. For example, the transport dolly 100 may be moved into a position such that the front end 202 or the rear end 204 of the robotic drive unit 200 is within the base frame of the transport dolly 100. Once the robotic drive unit 200 is generally positioned within the base frame of the transport dolly 100, at reference numeral 904, the method of transport 900 includes aligning the socket 606 of the spline shaft assembly 154 of the transport dolly 100 with an engagement hole 214 of the robotic drive unit 200. The aligning at reference numeral 904 may be performed as described above with reference to FIGS. 6A and 6B, for example. Further, because the robotic drive unit 200 includes an engagement hole on both right and left sides, the aligning at reference numeral 904 may include aligning both a right-side socket of the transport dolly 100 with a right-side engagement hole of the robotic drive unit 200 and aligning a left-side socket of the transport dolly 100 with a left-side engagement hole of the robotic drive unit 200.

At reference numeral 906, the method of transport 900 includes adjusting the ratcheting lever (i.e., the first ratcheting side arm 142, the second ratcheting side arm 143, and the ratcheting lever crossbar 141) of the transport dolly 100 to a proximate middle position over a range of angular displacement $\phi$ of the ratcheting lever (FIG. 2). Here, the ratcheting lever may be adjusted to the proximate middle position of angular displacement $\phi$ by moving the handle 146 and the displacement rod 145 to be centered about the locking handle block 166 (FIG. 2), as described above.

At reference numeral 908, the method of transport includes setting the ratchet knob 614 of the ratcheting lever (i.e., at the ratcheting end 612) to a position for free rotation of the spline shaft assembly 154. Further, because the robotic drive unit 200 includes a spline shaft assembly 152, the setting at reference numeral 908 may include setting a ratchet knob for both the spline shaft assemblies 152 and 154 to a position for free rotation. In this position, as described above with reference to FIGS. 6A and 6B, the spline shaft assemblies 152 and 154 may be freely moved or displaced to grab the drive stubs of the robotic drive unit 200.

At reference numeral 910, the method of transport 900 includes laterally displacing and rotating the socket 606 of the spline shaft assembly 154 to position the socket 606 through the engagement hole 214 and over the drive stub 222 of the jack wheel 220 of the robotic drive unit 200, as described above with reference to FIGS. 6A and 6B. Again, because the robotic drive unit 200 includes a spline shaft assembly 152, the laterally displacing and rotating at reference numeral 910 may include laterally displacing and rotating both the spline shaft assemblies 152 and 154 to grab both drive stubs of the robotic drive unit 200.

At reference numeral 912, the method of transport 900 includes setting the ratchet knob 614 of the ratcheting lever (i.e., at the ratcheting end 612) to a position for ratcheting the spline shaft assembly 154. Further, because the robotic drive unit 200 includes a spline shaft assembly 152, the setting at reference numeral 912 may include setting a ratchet knob for both the spline shaft assemblies 152 and 154. After setting the ratchet knob(s), as described above with reference to FIGS. 6A, 6B, 7A, and 7B, the spline shaft assemblies 152 and 154 may be rotated by way of pushing or pulling the ratcheting lever in either the direction $D_A$ or $D_B$ (FIGS. 7A and 7B) using handle 146 and the displacement rod 145.

Here, it should be appreciated that, by setting the ratchet knob 614 at reference numeral 912, a direction of ratcheting (i.e., clockwise or counter-clockwise) of the head of the ratcheting end 612 (FIG. 6A) may be set. In other words, by setting the ratchet knob 614 to one side, the ratcheting end 612 may be set to grip the spline shaft assembly 154 and turn the spline shaft assembly 154 in the clockwise direction, when a force is applied to the ratcheting end 612 as a lever. Alternatively, by setting the ratchet knob 614 to a second side, the ratcheting end 612 may be set to grip and turn the spline shaft assembly 154 in the counter-clockwise direction, when a force is applied to the ratcheting end 612 as a lever.

At reference numeral 914, the method of transport 900 includes adjusting an angular position of the ratcheting lever to engage the jack wheels 220 and 224. This adjusting may be achieved by pushing or pulling the ratcheting lever in either the direction $D_A$ or $D_B$ (FIGS. 7A and 7B) using handle 146 and the displacement rod 145, as described above with reference FIGS. 7A and 7B. At reference numeral 916, the method of transport 900 includes locking the ratcheting lever and the jack wheels 220 and 224 of the robotic drive unit 200 at the angular position achieved by the adjusting at reference numeral 914. For example, as described above with reference to FIG. 8, the jack wheels 220 and 224 of the robotic drive unit 200 may be locked in place by rotating the handle 146 by 90 degrees.

At reference numeral 918, the method of transport 900 includes moving the robotic drive unit 200 using the elevated handgrip bar 122 (FIG. 1) of the transport dolly 100. It is noted that, because the jack wheels 220 and 224 of the robotic drive unit 200 are both engaged and locked in position, it may be generally easier to move the robotic drive unit 200. Once the robotic drive unit 200 is repositioned, the handle 146 may be unlocked, and the handle 146 and the displacement rod 145 may be adjusted in either the direction $D_A$ or $D_B$ to disengage the jack wheels 220 and 224.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A transport apparatus, comprising:
 a base frame;
 an elevated handgrip assembly secured to and elevated from the base frame; and
 a wheel lock assembly that locks a jack wheel into an engaged position for manual displacement of a drive unit using the elevated handgrip assembly, the wheel lock assembly comprising:
  a lever that extends over the base frame; and
  a shaft assembly adjustably coupled to the lever and configured to couple to the jack wheel.

2. The transport apparatus according to claim 1, wherein the shaft assembly comprises a spline shaft, a knob secured to a first end of the spline shaft, and a socket secured to a second end of the spline shaft.

3. The transport apparatus according to claim 2, further comprising a spline shaft mount secured to the base frame.

4. The transport apparatus according to claim 3, wherein the spline shaft extends through the lever and the spline shaft mount.

5. The transport apparatus according to claim 4, wherein the wheel lock assembly further comprises:
 a linear displacement rod;
 a handle secured to the linear displacement rod; and
 at least one joint coupled between the linear displacement rod and the lever,
 wherein the handle and the linear displacement rod displace the lever within at least a predetermined range of angular displacement about a pivot point at the spline shaft mount.

6. The transport apparatus according to claim 1, wherein the shaft assembly comprises:
 a right-side shaft assembly adjustably coupled to a first side of the lever; and
 a left-side shaft assembly adjustably coupled to a second side of the lever.

7. The transport apparatus according to claim 6, wherein:
 the right-side shaft assembly comprises a right-side spline shaft, a right-side knurled knob secured to a first distal end of the right-side spline shaft, and a right-side socket secured to a second distal end of the right-side spline shaft; and
 the left-side shaft assembly comprises a left-side spline shaft, a left-side knurled knob secured to a first distal end of the left-side spline shaft, and a left-side socket secured to a second distal end of the left-side spline shaft.

8. The transport apparatus according to claim 7, wherein the base frame comprises:
 a crossbar;
 a first extension bar that extends from a first distal end of the crossbar; and
 a second extension bar that extends from a second distal end of the crossbar.

9. The transport apparatus according to claim 8, further comprising:
 at least one wheel secured to the base frame; and
 at least one bumper secured to a side of the first extension bar and at least one bumper secured to a side of the of the second extension bar.

10. The transport apparatus according to claim 8, further comprising:
 a right-side spline shaft mount secured to the first extension bar; and
 a left-side spline shaft mount secured to the second extension bar.

11. The transport apparatus according to claim 10, wherein:
 the right-side spline shaft extends through the first side of the lever and the right-side spline shaft mount; and
 the left-side spline shaft extends through the second side of the lever and the left-side spline shaft mount.

12. The transport apparatus according to claim 11, wherein the wheel lock assembly further comprises:
 a linear displacement rod;
 a handle secured perpendicularly to one distal end of the linear displacement rod; and at least one joint coupled between the linear displacement rod and the lever, wherein the handle and the linear displacement displace the lever within at least a predetermined range of angular displacement about a pivot point at the right-side spline shaft mount and the left-side spline shaft mount.

13. A transport apparatus, comprising:

a base frame comprising a crossbar, a first extension bar that extends from a first distal end of the crossbar, and a second extension bar that extends from a second distal end of the crossbar;

an elevated handgrip bar secured to and elevated from the base frame by at least one elevation column; and a wheel lock assembly that locks a jack wheel into an engaged position for manual displacement of a drive unit using the elevated handgrip bar, the wheel lock assembly comprising:

a ratcheting lever that extends over the base frame;

a spline shaft assembly adjustably coupled to the ratcheting lever and configured to couple to the jack wheel; and a handle that displaces the ratcheting lever within at least a predetermined range of angular displacement.

14. The transport apparatus according to claim 13, wherein the spline shaft assembly comprises:

a right-side spline shaft assembly adjustably coupled to a first ratcheting side of the ratcheting lever; and a left-side spline shaft assembly adjustably coupled to a second ratcheting side of the ratcheting lever.

15. The transport apparatus according to claim 14, wherein:

the right-side spline shaft assembly comprises a right-side spline shaft, a right-side knurled knob secured to a first distal end of the right-side spline shaft, and a right-side socket secured to a second distal end of the right-side spline shaft; and the left-side spline shaft assembly comprises a left-side spline shaft, a left-side knurled knob secured to a first distal end of the left-side spline shaft, and a left-side socket secured to a second distal end of the left-side spline shaft.

16. The transport apparatus according to claim 13, wherein the wheel lock assembly further comprises:

a linear displacement rod;

a handle secured to the linear displacement rod; and at least one joint coupled between the linear displacement rod and the ratcheting lever, wherein the handle and the linear displacement rod are configured to displace the ratcheting lever within at least a predetermined range of angular displacement about a pivot point.

17. A transport apparatus, comprising:

an elevated handgrip assembly secured to and elevated from a base frame; and an assembly that adjusts a jack wheel of a unit into an engaged position for manual displacement of the unit using the elevated handgrip assembly, the assembly comprising:

a lever; and a shaft assembly adjustably coupled to the lever and configured to couple to the jack wheel of the unit.

18. The transport apparatus according to claim 17, wherein:

the lever comprises a ratcheting lever; and the shaft assembly comprises a spline shaft, a knob secured to a first end of the spline shaft, and a socket secured to a second end of the spline shaft.

19. The transport apparatus according to claim 18, further comprising a spline shaft mount secured to the base frame, wherein the spline shaft extends through the spline shaft mount.

20. The transport apparatus according to claim 17, wherein the assembly further comprises:

a linear displacement rod;

a handle secured to the linear displacement rod; and at least one joint coupled between the linear displacement rod and the lever, wherein the handle and the linear displacement rod are configured to displace the lever within at least a predetermined range of angular displacement about a pivot point.

* * * * *